United States Patent [19]

Young-Han

[11] Patent Number: 5,745,456
[45] Date of Patent: Apr. 28, 1998

[54] DISK SENSING APPARATUS FOR DISCRIMINATING DISK TYPE IN A DUAL PURPOSE DISK PLAYER

[75] Inventor: Kim Young-Han, Suwon, Rep. of Korea

[73] Assignee: SamSung Electronics Co., Ltd., Kyungki-do, Rep. of Korea

[21] Appl. No.: 917,380

[22] Filed: Jul. 23, 1992

[30] Foreign Application Priority Data

Jul. 31, 1991 [KR] Rep. of Korea ............ 91-13287

[51] Int. Cl.⁶ ...................................... G11B 7/00
[52] U.S. Cl. .............................. 369/50; 369/58
[58] Field of Search ................ 369/54, 58, 44.32; 307/311, 359

[56] References Cited

U.S. PATENT DOCUMENTS

| | | | |
|---|---|---|---|
| 4,755,980 | 7/1988 | Yoshinaru et al. | 369/54 |
| 4,825,109 | 4/1989 | Reynolds | 307/601 |
| 5,130,963 | 7/1992 | Kusano et al. | 369/44.32 X |
| 5,172,354 | 12/1992 | Otsubo | 369/54 X |
| 5,182,739 | 1/1993 | Kime et al. | 369/44.32 |

FOREIGN PATENT DOCUMENTS

| | | |
|---|---|---|
| 62-60169 | 3/1987 | Japan. |
| 63-109366 | 7/1988 | Japan. |

OTHER PUBLICATIONS

Shen and Kong, Applied Electromagnetism, 1987, p. 156.
Sedra and Smith, Microelectronic Circuits, 1987, Chapters 3, 5, and 8.

*Primary Examiner*—Nabil Hindi
*Attorney, Agent, or Firm*—Robert E. Bushnell, Esq.

[57] ABSTRACT

A disk is detected as being loaded on a clamper in a dual purpose laser disk player and the disk is then determined to be either a compact disk or a laser disk. A disk sensor detects a loaded disk and a pickup unit, having both a pickup and tilt sensor mounted thereon, is moved radially inward to be adjacent a compact disk recognition switch. The pickup is then operated in order to attempt to achieve focus lock. Once focus lock is obtained the disk is determined to be a compact disk and the disk player is operated as a compact disk player. If focus lock is not obtained the pickup unit is moved radially outward while a tilt sensor provides light to the disk. A laser disk discriminating circuit detects the light reflected from the disk and compares the reflected light's level to a reference value. The comparison result is provided to a microprocessor, via a buffer, and the microprocessor determines whether or not the light is being reflected from a data are of the disk. When the microprocessor determines the light is not reflected from the data area of the disk the microprocessor determines the disk to be a laser disk, stops the movement of the pickup unit, obtains focus lock and operates the disk player as a laser disk player.

15 Claims, 2 Drawing Sheets mv # DISK SENSING APPARATUS FOR DISCRIMINATING DISK TYPE IN A DUAL PURPOSE DISK PLAYER

BACKGROUND OF THE INVENTION

1. Field of the Invention

The present invention relates to a Laser Disk Player (LDP), and more particularly to a disk sensing apparatus of laser disk(LD)/compact disk(CD) dual-purpose LDP which can read the data automatically from data domain by sensing the disks of LD group and CD group when the disks are loaded to the clamper.

2. Description of the Prior Art

Generally, LDP is composed of a clamper for being loaded with disks, a spindle motor for rotating said clamper, a tilt sensor for sensing the tilt of disks loaded to the clamper, a disk discriminating switch for discriminating the kind of disk, i.e., for discriminating the disk of CD group and LD group, and a pickup for reading the data recorded in the disk. At this point, at least more than two disk discriminating switches have been mounted for sensing.

FIG. 1 is a side view for illustrating briefly an embodiment of conventional disk sensing apparatus for sensing the disk of CD group and LD group by utilizing two disk discriminating switches.

According to FIG. 1, the clamper 1 loaded with disk rotates the disk by the rotation of spindle motor 2.

On the sides of said clamper 1 and spindle motor 2 a CD recognition switch 3 for sensing the disk of CD group and a LD recognition switch 4 for sensing the disk of LD group are mounted.

At this point, generally, the CD recognition switch 3 is installed on a place 24 mm away from the axis of spindle motor 2 and LD recognition switch 4 is installed on a place 65 mm away from the axis of spindle motor 2.

This is because the read-in domain of 8 cm and 12 cm CD group disk is located on a place 23.5 mm away from the axis of spindle motor 2 and in the cases of 20 cm and 30 cm LD group disk, the read-in domain is situated on a place 53.5 mm away from the axis of spindle motor 2.

Meanwhile, a pickup 5 is installed for horizontal movement between said CD recognition switch 3 and LD recognition switch 4.

Accordingly, in the conventional disk sensing apparatus as constructed in the foregoing, when the disk of CD group is loaded in the clamper 1, a microprocessor of LDP system moves the pickup 5 to a place where LD recognition switch 4 is installed.

When said pickup 5 is moved to a place where LD recognition switch 4 is installed, microprocessor drives the pickup 5 and checks if focus lock is performed.

At this point, as the disk of CD group is loaded, focus lock is not performed, so said microprocessor moves the pickup 5 to the clamper side 1 again.

When said pickup 5 is moved toward the clamper 1 side up to a place where CD recognition switch 3 is installed, microprocessor drives the pickup 5, and checks again if focus lock is performed.

At this moment, as the disk of CD group is loaded, focus lock is performed and microprocessor perceives the disk loaded in clamper 1 as CD.

If the disk of LD group is loaded in clamper 1, the microprocessor of LDP system moves the pickup 5 to a place where LD recognition switch 4 is installed and checks if focus lock is performed, and as, at this very moment, focus lock is realized, microprocessor perceives that the disk of LD group is loaded in the clamper 1.

Meanwhile, Japanese laid open utility model application No. Sho 63(1988)-109366 entitled, "discriminating apparatus of optical disk" discloses a technique wherein reproduction only disk or recordable disk is discriminated and automatic switch of operation for optical disk record-reproducing apparatus can be performed by comparing the signal level of detection output obtained from the optical pickup with the predetermined reference level.

Furthermore, Japanese laid open patent application No. Sho 62(1987)-60169 entitled "driving method and apparatus for video disk player" discloses a technique wherein, by sensing the compact disk and video disk being loaded separately at the respectively-constructed compact disk rotary motor and video disk rotating motor, the pickup is horizontally moved adequately according to said disks, and the loaded disks are rotated according to corresponding disk rotary motors for reproduction of disks.

However, as illustrated in FIG. 1, the conventional disk sensing apparatus needs must be equipped with mechanical instruments like CD, LD recognition switches, which however results in a problem of compulsory mechanical assembly.

Furthermore, though Japanese laid open utility model application No. Sho 63-109366 provides an excellent technique for discriminating between reproduction—only disk and recordable disk, there has been a problem which can not discriminate between CD and LD.

Still furthermore, Japanese laid open utility model application No. Sho 62-10619 provides a technique of driving CD and video disk separately however this application involves a problem of not discriminating between CD and LD.

SUMMARY OF THE INVENTION

Accordingly, it is the object of the present invention to provide a disk sensing apparatus which can discriminate CD from LD by utilizing CD recognition switch, CD recognition sensor and tilt sensor. It is another object of the present invention to provide a simple mechanical assembly by moving the pickup automatically to a data read position according to the discrimination of data reading.

It is still another object of the present invention to provide a disk sensing apparatus which can sense the disk at a reasonable cost along with simplified mechanical assembly by sensing CD group and LD group utilizing a tilt sensor for sensing the tilt of the disk.

The disk sensing apparatus for achieving said object in accordance with the present invention is, when it is discriminated by a disk sensor that the disk is loaded on the clamper, the pickup is moved to the inside of the disk and further up to the position of CD recognition switch for discrimination of focus lock, and when focus lock is performed the disk sensing apparatus perceives as CD group and reads the data. When focus lock is not performed, the pickup is moved to the outside to be perceived as LD group through tilt sensor and LD discriminating means, and at the same time for data to be read.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
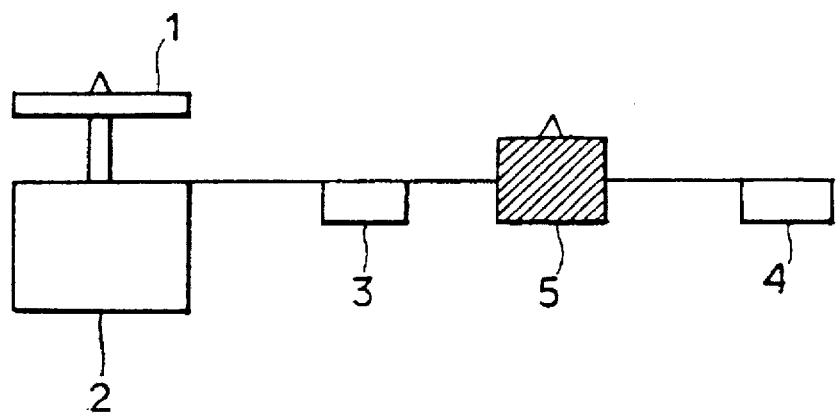
FIG. 1 is a schematic lateral view for showing the construction of conventional disk sensing apparatus.
Figure 2:
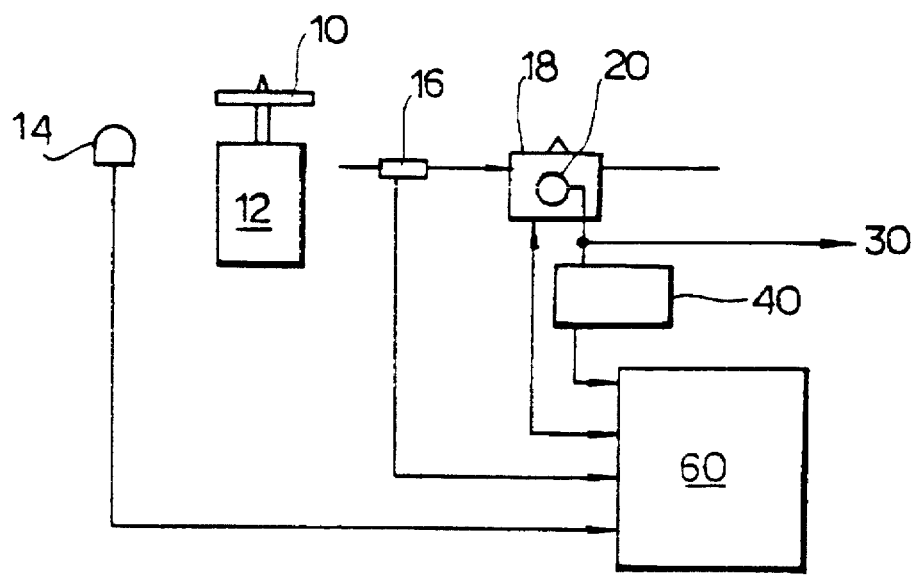
FIG. 2 is a schematic lateral view for showing the construction of a disk sensing apparatus in accordance with the present invention.

FIG. 2 is a schematic lateral view for showing the construction of a disk sensing apparatus in accordance with the present invention.

According to FIG. 2, the clamper 10 for loading the disk is rotated by a spindle motor 12 for rotation of disk.

On the sides of said clamper 10 and spindle motor 12 a CD recognition switch 16 for sensing the disk of CD group and a disk sensor 14 for discriminating existence and non-existence of disk are mounted.

On the external side of said CD recognition switch 16, a pickup 18 is mounted for horizontal movement.

Meanwhile, on said pickup 18, a tilt sensor 20 is mounted for sensing the tilt of the disk.

Conventionally in the present invention, said tilt sensor 20 for sensing the tilt of disk is attached to the pickup 18 for sensing of LD group disk.

In other words, the signal of tilt sensor 20 is inputted to tilt sensing means 30 for sensing the tilt of disk and simultaneously is inputted to LD discriminating means 40 to be utilized as signal for discriminating LD.

The output signals of LD discriminating means 40 which receives signals from said disk sensor 14, CD recognition switch 16, pickup 18 and tilt sensor 20 are inputted respectively to a microprocessor 60 for disk sensing.

Accordingly, the microprocessor 60 shown in FIG. 2 checks whether disk is loaded on the clamper 10 by means of disk sensor 14.

If it is discriminated, during the check of disk loading condition by virtue of disk sensor 14, that disk is not loaded in clamper 10, the microprocessor 60 keeps the the pickup 18 in the present position.

However, if the disk is not loaded on clamper 10, microprocessor 60 drives the pickup 18 and moves the pickup to the position of CD recognition switch 16.

When the pickup 18 is moved to the position of CD recognition switch 16, microprocessor 60 senses the movement by means of CD recognition switch 16 and checks if focus lock is performed by operating the pickup 18.

At this point, if the disk loaded in said clamper 10 is CD groups of 8 cm or 12 cm CD or CDV(Compact Disk Video), then focus lock is realized.

If the disk loaded in clamper 10 is LD group of 20 cm or 30 cm of LD, focus lock will not occur when focusing is made on a position of CD recognition switch 16 as mentioned above.

This is because the place, that is, on said central part of LD, where said CD recognition switch 16 is located, is a place made of paper having different amount of reflected light.

In this manner, if focus lock does not occur on the position of CD recognition switch 16, the microprocessor 60 drives pickup 18 for movement to the outside (right side on the drawing).

From this point, the microprocessor 60 discriminates whether or not the disk is LD group by way of tilt sensor 20 and LD discriminating means 40.

Figure 3:
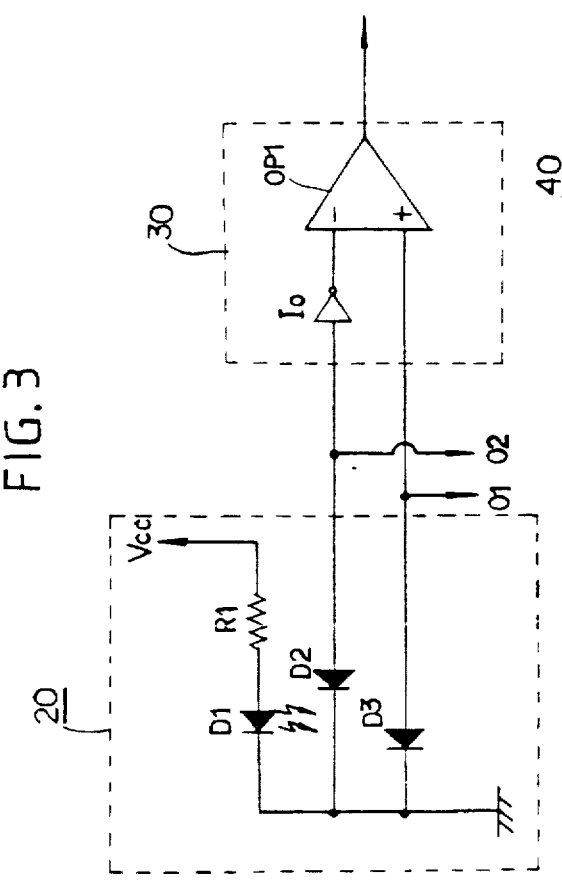
FIG. 3 is a circuit drawing of a tilt sensor 20 applied to the disk sensing apparatus of the present invention as illustrated in FIG. 2.

In other words, tilt sensor 20 conventionally senses the tilt of the disk mounted on the clamper 10, and outputs to tilt sensing means 30 the current values changing according to the disk conditions, and accordingly the disk of LD group is mounted on the clamper 10 of disk sensing apparatus as shown in FIG. 2, and when the pickup 18 is moved to the outside by microprocessor 60, the light emitted from luminous element D1 of tilt sensor 20 in FIG. 3 is scanned to LD.

The light scanned to LD is reflected by LD for incidence on light receiving elements D2, D3.

At this point, the quantity of light emitted into the light receiving elements D2, D3, being reflected by LD differs according to the LD condition which reflects the light and the distance between said tilt sensor 20 and LD.

In this manner, when the quantity of light emitted into the light receiving elements D2, D3 being reflected by LD varies, the output signals O1, O2 also change.

Therefore, when focus lock does not occur on the position of CD recognition switch 16, causing the pickup 18 to be moved to the outside by microprocessor 60 and when the tilt sensor 20 mounted on the moved pickup 18 enters the data domain, the light emitted from luminous element D1 is inputted into light receiving elements D2, D3.

At this moment, current flows in the light receiving elements D2, D3 and the levels of output signals O1, O2 become less than the predetermined values.

However, once out of data domain of LD, the levels of output signals O1, O2 become more than the predetermined values because the light inputted into light receiving elements D2, D3 is limited.

Meanwhile, when the disk mounted on clamper 10 is tilted, the quantity of light inputted into light receiving elements D2, D3 mounted on the pickup 18 with predetermined space differs each other and accordingly the output signals O1, O2 are different, as mentioned above, one of the output signals in tilt sensor 20 is caused to invert by the inverter Io of tilt sensing means 30, and the difference from the other signal is obtained in OP(operation) amplifier OP1 for amplification, then the tilt of the disk mounted on clamper 10 can be obtained.

Figure 4:
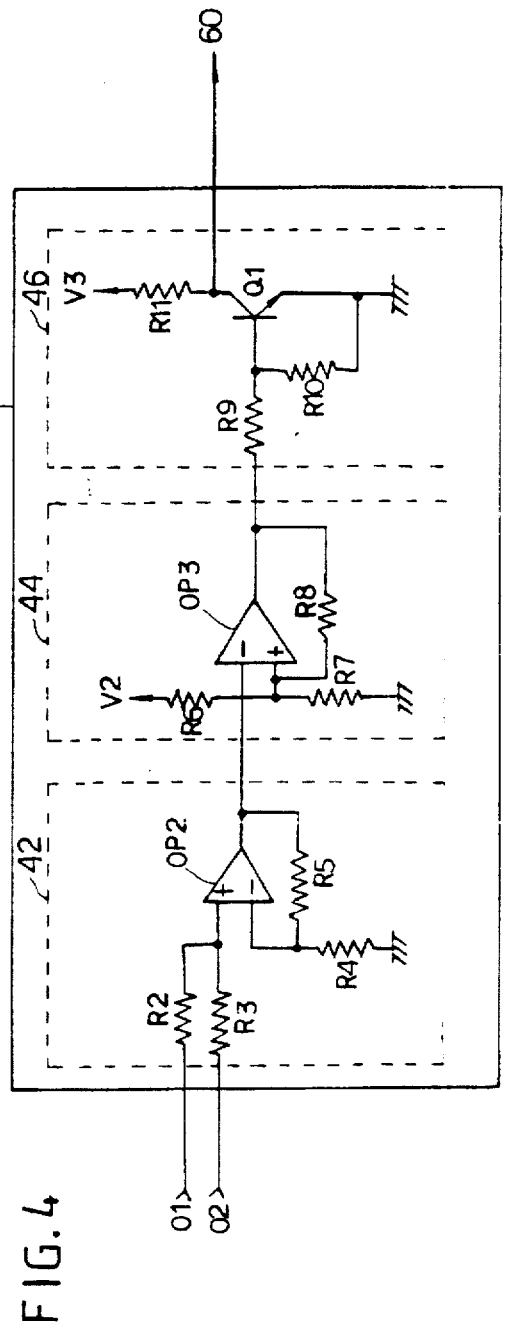
FIG. 4 is a circuit drawing of an embodiment of LD discriminating means 40 as shown in said FIG. 2.

FIG. 4 is a circuit drawing of an embodiment of LD discriminating means 40 as shown in said FIG. 2.

LD discriminating means 40 is composed of detecting means for received quantity of light 42, comparing means 44 and a buffer 46.

Among the above construction, detecting means for received quantity of light 42 includes resistors R2–R5 and an OP amplifier OP2, and as illustrated in FIG. 3, adds up two outputs O1, O2 of tilt sensor 20 for detection of received quantity of light.

Comparing means 44 includes resistors R6–R8 and an OP amplifier OP3 and the output of said detecting means for received quantity of light 42 is compared with the predetermined reference value determined by resistors R6, R7.

At this point, the predetermined reference value is made lower than the output of said detecting means for received quantity of light 42 when the light emitted from the luminous element D1 of tilt sensor 20 is inputted to light receiving elements D2, D3 by being reflected from the data recording surface of LD.

The buffer 46 includes resistors R9–R11 and a transistor Q1, and shapes and simultaneously inverts the output of said comparing means 44. The buffer also matches the impedance for outputting to microprocessor 60.

Accordingly, when the tilt sensor 20 mounted on pickup 18 enters the data domain of post read-in of LD, and when the output signals O1, O2 of tilt sensor 20 are less than the predetermined levels as illustrated in FIG. 3, the signals added up in detecting means for received quantity of light 42 of LD discriminating means 40 become less than the predetermined levels.

In other words, the added-up signals are less than the predetermined reference values of comparing means 44.

Therefore, the output of comparing means 44 for comparing the output of detecting means for received quantity of light 42 with predetermined reference value becomes high level.

The high-levelled output outputted from said comparing means 44 drives the transistor Q1 of the buffer 46.

When the transistor Q1 is driven, the output of the buffer 46 becomes low level, and microprocessor 60 perceives that tilt sensor 20 is located in the position of data domain of LD when the output of said buffer 46 is low level.

However, when the tilt sensor 20 mounted on pickup 18 gets out of the data domain of LD, the levels of output signals O1, O2 become above the predetermined levels due to limited light inputted into light receiving elements D2, D3.

When output signals O1, O2 are above the predetermined levels, the outputs added up at detecting means for received quantity of light 42 become above the predetermined levels.

In other words, the outputs become larger than the predetermined reference values compared in comparing means 44.

Therefore, the output of comparing means 44 for comparing the output of detecting means for received quantity of light 42 with the predetermined reference values become low level.

When the output becomes low level at said comparing means 44, the transistor Q1 of buffer 46 is not driven.

When the transistor Q1 is not driven, the output of buffer 46 becomes high level.

When the output of said buffer is high level, microprocessor 60 perceives that tilt sensor 20 has escaped the data domain of LD, and simultaneously perceives that the disk is LD.

In this manner, LD discriminating means 40 discriminates whether or not the disk loaded in clamper is LD by utilizing the output of tilt sensor 20 which discriminates the tilt of disks, and by discrimination of data domain, is outputted to microprocessor 60.

Microprocessor 60, when it is discriminated that the disk is LD in said LD discriminating means 40 and tilt sensor 20 gets out of data domain, stops the movement of pickup 18, performs focus lock and begin to read the data of LD.

Accordingly, it is the object of the present invention to provide a disk sensing apparatus, which can discriminate CD from LD by utilizing CD recognition switch, CD recognition sensor and tilt sensor, and to provide readability of data by moving automatically the pickup to the read position of data according to the discrimination.

It is another object of the present invention to provide a simplified mechanical assembly as well as an effect of sensing the disks at a reasonal price by sensing the disks of CD group and the disks of LD group utilizing tilt sensor for sensing the tilt of the disks.

The foregoing description of the preferred embodiment has been presented for the purpose of illustration and description. It is not intended to limit the scope of this invention. Many modifications and variations are possible in light of the above teaching.

It is intended that the scope of the invention be defined by the claims.

What is claimed is:

1. A disk sensing apparatus, comprising:
   a disk sensor for sensing whether a disk is loaded on a clamper;
   a pickup;
   laser disk discriminating means for detecting a data domain of a laser disk according to the output of a tilt sensor mounted on the pickup, said laser disk discriminating means comprising:
   detecting means for receiving light reflected from said disk in response to light output by said tilt sensor and outputting a level value corresponding to the quantity of said received light, and
   comparing means for comparing the level value output by said detecting means to a predetermined reference value and for generating a comparison result signal;
   a compact disk recognition switch; and
   a microprocessor for determining said disk to be a compact disk when focus lock is achieved by said pickup after said pickup is moved to a position adjacent to said compact disk recognition switch once loading of disks is perceived by disk sensor, and for determining said disk to be a laser disk when focus lock is not achieved after said pickup is moved to said position adjacent said compact disk recognition switch and when said laser disk discriminating means does not detect said data domain of said laser disk.

2. A disk sensing apparatus as defined in claim 1, wherein said laser disk discriminating means further comprises:
   a buffer for shaping and simultaneously inverting the comparison result signal generated by said comparing means for output to said microprocessor, said buffer performing impedance matching with said microprocessor.

3. A disk sensing apparatus as defined in claim 2, wherein said comparing means outputs a high level signal as said comparison result signal when said light output by said tilt sensor is reflected from the data recording surface of said laser disk.

4. A disk sensing apparatus, comprising:
   a disk sensor for sensing whether a disk is loaded on a clamper;
   a pickup;
   laser disk discriminating means for detecting a data domain of a laser disk according to the output of a tilt sensor mounted on the pickup;
   a compact disk recognition switch; and
   a microprocessor for determining said disk to be a compact disk when focus lock is achieved by said pickup after said pickup is moved to a position adjacent to said compact disk recognition switch once loading of disks is perceived by disk sensor, and for determine said disk to be a laser disk when focus lock is not achieved after said pickup is moved to said position adjacent said compact disk recognition switch and when said laser disk discriminating means does not detect said data domain of said laser disk, wherein said microprocessor, when the disk loaded in said damper is discriminated as not being said compact disk, moves the pickup away from said compact disk recognition switch and operates said tilt sensor for detecting the data domain of said laser disk by said laser disk discriminating means, wherein said microprocessor, when the disk loaded in said damper is discriminated as not being said compact disk, moves the pickup away from said compact disk recognition switch and operates said tilt sensor for detecting the data domain of said laser disk by said laser disk discriminating means.

5. A method for sensing a disk type in a dual purpose laser disk player, said method comprising the steps of:

determining whether a disk is loaded in a clamper;

maintaining the position of a pickup unit in its initial position when said determining step determines said disk is not loaded in said clamper;

moving said pickup unit in a first direction to a position adjacent to a compact disk recognition switch when said determining step determines said disk is loaded in said clamper;

determining when said pickup unit is adjacent said compact disk recognition switch;

performing a focus lock operation by operating a pickup mounted on said pickup unit when said pickup unit is determined to be adjacent said compact disk recognition switch;

determining said disk is a compact disk when focus lock is achieved and operating said dual purpose laser disk player accordingly;

moving said pickup unit in a second direction to a predetermined position away from said compact disk recognition switch when focus lock is not achieved;

operating a tilt sensor mounted on said pickup unit for determining whether said pickup unit is below a data area of said disk when said pickup unit reaches said predetermined position;

determining said disk to be a laser disk when said pickup unit is determined not to be under said data area of said disk and making a determination that said disk is a laser disk, stopping said movement of said pickup unit in said second direction and operating said laser disk player accordingly.

6. The method as claimed in claim 5, wherein said step of operating said tilt sensor further comprises the steps of:

comparing a level of light reflected from a surface area of said disk to a reference level;

determining said surface area to be said data area when said level of light is determined to be less than said reference level.

7. The method as claimed in claim 6, wherein said step of operating said tilt sensor further comprises the steps of:

outputting light from a light emitting means;

detecting light reflected from said surface area by means of two light receiving means;

adding output signals of said two light receiving means for generating said level of light;

generating a comparison result in response to said step of comparing said level of light reflected from said surface area of said disk to said reference level;

providing said comparison result through a buffer means to a microprocessor means for determining whether said surface area is said data area.

8. A disk discriminating apparatus for use in a dual purpose laser disk player for determining whether a disk is a compact disk or a laser disk, said disk discriminating apparatus comprising:

a disk sensor for detecting a disk loaded on a clamper;

a compact disk recognition switch;

a pickup unit having a pickup and tilt sensor attached thereto;

a laser disk discriminating means for detecting a data area of said laser disk; and a microprocessor for:

determining whether a disk is loaded in said damper in response to an output from said disk sensor;

maintaining the position of the pickup unit in its initial position when said disk is determined not to be loaded in said clamper;

moving said pickup unit in a first direction to a position adjacent to said compact disk recognition switch when said disk is determined to be loaded in said clamper;

determining when said pickup unit is adjacent said compact disk recognition switch;

performing a focus lock operation by operating said pickup when said pickup unit is determined to be adjacent said compact disk recognition switch;

determining said disk to be said compact disk when focus lock is achieved and operating said dual purpose laser disk player accordingly;

moving said pickup unit in a second direction to a predetermined position away from said compact disk recognition switch when focus lock is not achieved;

operating said tilt sensor for determining whether said pickup unit is below said data area of said disk when said pickup unit reaches said predetermined position;

determining said disk to be a laser disk when said pickup unit is determined not to be under said data area of said disk and making a determination that said disk is said laser disk, stopping said movement of said pickup unit in said second direction and operating said dual purpose laser disk player accordingly.

9. The apparatus as claimed in claim 8, wherein said laser disk discriminating means comprises:

detecting means for receiving light reflected from said disk in response to light output by said tilt sensor and outputting a level value corresponding to the quantity of said received light;

comparing means for comparing the level value output by said detecting means to a predetermined reference value and for generating a comparison result signal; and a buffer for shaping and simultaneously inverting the comparison result signal generated by said comparing means for to a microprocessor, said buffer performing impedance matching with said microprocessor.

10. The apparatus as claimed in claim 9, wherein said tilt sensor comprises a light emitting diode and first and second light receiving diodes.

11. The apparatus as claimed in claim 10, wherein said detecting means comprises:

a first resistor connected to receive an output of said first light receiving diode;

a second resistor connected to receive an output of said second light receiving diode;

a first operational amplifier having a noninverting input connected in common to said first and second resistors;

a third resistor connected between an inverting input of said first operational amplifier and a reference potential; and a fourth resistor connected between the inverting input terminal and an output of said first operational amplifier.

12. The apparatus as claimed in claim 11, wherein said comparing means comprises:
   a second operational amplifier having an inverting terminal connected to the output of said first operational amplifier;
   a fifth resistor connected between a voltage source and a noninverting input of said second operational amplifier;
   a sixth resistor connected between said noninverting input of said second operational amplifier and said reference potential; and
   a seventh resistor connected between said noninverting input and an output of said second operational amplifier.

13. The apparatus as claimed in claim 12, wherein said buffer comprises:
   a transistor having a base, an emitter connected to said reference potential and a collector connected to an input of said microprocessor;
   an eighth resistor connected between said output of said second operational amplifier and said base;
   a ninth resistor connected between said emitter and said base; and
   a tenth resistor connected between a voltage and said collector.

14. The apparatus as claimed in claim 10, said tilt sensor detecting a data area of said disk loaded on said clamper.

15. The apparatus as claimed in claim 14, wherein said tilt sensor further comprises:
   an inverter connected to invert the output of said first light receiving diode; and
   an operational amplifier having an inverting terminal connected to receive an output of said inverter and a noninverting terminal connected to receive the output of said second light receiving diode.

* * * * *